United States Patent
Arkko et al.

(10) Patent No.: US 10,015,136 B2
(45) Date of Patent: Jul. 3, 2018

(54) METHOD AND FIREWALL FOR SOLICITING INCOMING PACKETS

(71) Applicant: Telefonaktiebolaget L M Ericsson (publ), Stockholm (SE)

(72) Inventors: Jari Arkko, Kauniainen (FI); Fredrik Garneij, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 22 days.

(21) Appl. No.: 14/760,569

(22) PCT Filed: Jan. 31, 2013

(86) PCT No.: PCT/EP2013/051893
§ 371 (c)(1),
(2) Date: Jul. 13, 2015

(87) PCT Pub. No.: WO2014/117843
PCT Pub. Date: Aug. 7, 2014

(65) Prior Publication Data
US 2015/0358284 A1 Dec. 10, 2015

(51) Int. Cl.
*H04L 29/06* (2006.01)
*H04W 12/08* (2009.01)

(52) U.S. Cl.
CPC ......... *H04L 63/0227* (2013.01); *H04W 12/08* (2013.01); *H04L 63/164* (2013.01)

(58) Field of Classification Search
None
See application file for complete search history.

(56) References Cited

U.S. PATENT DOCUMENTS 5,835,726 A * 11/1998 Shwed ................ H04L 9/3247
709/229
6,789,203 B1 * 9/2004 Belissent ............... H04L 47/10
370/229

(Continued)

FOREIGN PATENT DOCUMENTS

WO 2009149516 A1 12/2009

OTHER PUBLICATIONS

Zhang, D., et al., "Cryptographically Generated Address (CGA) Extension Header for Internet Protocol version 6 (IPv6) draft-dong-savi-cga-header-03.txt", Internet Engineering Task Force, IETF; Standardworkingdraft, Internet Society (ISOC) 4, Rue Des Falaises CH-1205 GE, No. 3, Jul. 12, 2010, pp. 1-18, XP015069956.

*Primary Examiner* — Henry Tsang
(74) *Attorney, Agent, or Firm* — Rothwell, Figg, Ernst & Manbeck, p.c.

(57) ABSTRACT

This disclosure relates to controlling unwanted traffic to a device (40) in a communication network (30). The idea is to provide a more fine-grained control of incoming packets or connection attempts, by using an inclusive firewall (10) i.e. a firewall operating on "white-listed" traffic to a device (40). The disclosure, relates to a method for controlling a data flow to a device in a communication network, using a firewall located in the path between said device and a source node. The method comprises receiving (210), in said firewall, at least one data packet of said data flow. The firewall then reads (220), a predefined selection of bits of said at least one data packet, wherein the selection of bits is contained in at least one field of said data packet. The at least field or fields, including the selection of bits, carry a first type information. The firewall then forwards (240) the at least one data packet to the device, if selection of bits fulfills a policy of said device. The policy is defining requirements by which packets to said device are solicited. Hence, the (Continued)

solicitation of packets is a second type of information carried by said selection of bits. The disclosure further relates to a methods controlling a data flow, as well as to a firewall (10), a source (20) and a device (40).

17 Claims, 5 Drawing Sheets

(56) References Cited

U.S. PATENT DOCUMENTS

| | | | |
|---|---|---|---|
| 7,881,755 B1* | 2/2011 | Mishra | H04W 52/0229 455/574 |
| 2006/0020796 A1* | 1/2006 | Aura | H04L 9/3236 713/168 |
| 2009/0288144 A1* | 11/2009 | Huber | G06Q 20/1235 726/3 |
| 2012/0184205 A1* | 7/2012 | Luft | H04W 52/02 455/9 |
| 2013/0152195 A1* | 6/2013 | Nandha Premnath | H04L 63/1466 726/22 |

\* cited by examiner

METHOD AND FIREWALL FOR SOLICITING INCOMING PACKETS

CROSS-REFERENCE TO RELATED APPLICATION

This application is a 35 U.S.C. § 371 National Phase Entry Application from PCT/EP2013/051893, filed Jan. 31, 2013, and designating the United States.

TECHNICAL FIELD

The disclosure relates to controlling a data flow to a device in a communication network, using a firewall located in the path between the device and a source node sending data to the device. In particular the disclosure relates to controlling a data flow to a device in a communication network, using a selection of bits in the packets. The disclosure further relates to a method controlling a data flow, as well as to a firewall, a source and a device.

BACKGROUND ART

In communication systems where the user terminals and/or users are sometimes mobile, many applications require ability for a network entity or peer to contact a device. However, at the same time preventing the unauthorized traffic to users and equipment is important, because, any public network with constrained radio resources will involve some cost, and it is often a concern to ensure that no unwanted traffic goes to the device. Unfortunately, this goal is often in conflict with the goal of making the device easily reachable from other devices. For instance, a device monitoring a vehicle or goods transport may roam in various different countries, and receiving unwanted traffic on the device's address could be costly at roaming data transfer rates. In particular, as such a device is often energy constrained, as it often rely on an internal power supply with no or limited possibility of recharging.

Today, visibility of a device in a network is arranged in various ways. One way is that a device poll some central server often enough to get any messages that it has gotten. Another possibility is that the device keeps a Network Address Translation, NAT, traversal state through e.g. a NAT router or firewall, so that messages to that device can be sent to it at a temporary address and port number. However, either frequent polling of servers and NAT state refreshes are expensive both from a device power consumption point of view as well as being orders of magnitude more serious problem for network congestion than the frequent polling from the current smart phones is.

A different approach is that the devices are visible on a public address in the IPv4 or IPv6 Internet or that the device is visible on some private network (e.g., a corporate Access Point Name, APN). Though, using private networks and APNs is a possibility, it is often more expensive than using regular network access, and therefore difficult to employ, e.g. by small players.

However, direct connectivity to either IPv4 and IPv6 has the drawback that Internet exposes the device to any harmful activity from scanners and attackers. To prevent this, there are mechanisms for allowing devices to control a firewall or NAT in front of them. For instance, the Internet Engineering Task Force, IETF has recently defined the PCP, Port Control Protocol, mechanism. However, many of these mechanisms are focused on opening a specific address or port number, and therefore have limited mechanisms for protecting against attackers testing a known port. As a consequence, devices or clients need to have logic for handling unsolicited traffic in the device.

SUMMARY OF THE DISCLOSURE

This disclosure relates to controlling unrequested traffic to a device. The idea is to provide a more fine-grained control of incoming packets or connection attempts, by using an inclusive firewall i.e. a firewall operating on "white-listed" traffic to a device.

Hence, according to one aspect of the disclosure, it relates to a method for controlling a data flow to a device in a communication network, using a firewall located in the path between said device and a source node. The method comprises receiving, in said firewall, at least one data packet of the data flow. The firewall then reads a predefined selection of bits of the data packet, wherein the selection of bits is contained in at least one field of the data packet. The at least one field or fields, including the selection of bits, carry a first type of information. The firewall then forwards the at least one data packet to the device, if the selection of bits fulfils a policy of said device. The policy defines requirements by which packets to said device are solicited. Hence, the solicitation of packets is a second type of information carried by the selection of bits. The second type of information is "hidden" in the field or fields carrying the first type of information.

By using this method only solicited packets are forwarded to the device, as the firewall is inclusive. Hence, no logic for handling unsolicited traffic is needed within the device. Furthermore, as bits already contained in the packet are reused, the method does not require any additional data to be added to the packets.

This method is also advantageous in Machine to Machine, M2M, devices wherein such a solution minimizes the need of separation between the network path and the communication need. M2M devices are often power constrained. Hence, preventing unwanted traffic from reaching the devices is highly wanted, because receiving data costs energy.

According to one aspect of the disclosure it further relates to a method for controlling a data flow, wherein the policy further comprises flow control, in terms of a predefined number of connections or packets per selection of bits. Such a method may be used e.g. by an operator for limiting traffic to a subscriber.

According to one aspect of the disclosure it relates to a method for controlling a data flow, wherein the policy comprises a schedule for soliciting packets. This aspect is e.g. useful for power constrained devices, wherein the device need only to be "awake" and ready to receive data at certain moments in time defined by the schedule.

According to one aspect of the disclosure it relates to a method for controlling a data flow, further comprising receiving, in said firewall, a policy from the device. This aspect of the disclosure makes it possible for a device to control which packets are forwarded to it. The device may set a schedule or solicit all traffic comprising a particular sequence or source address.

According to one aspect of the disclosure it relates to a firewall, for controlling a data flow to a device in a communication network, comprising a network communication unit, a memory and a processor. The network communication unit configured to communicate with the communication network and the memory is configured to store a policy defining requirements by which packets to said device are solicited. The processor is configured to:
- receive, using said network communication unit, at least one data packet of said data flow,
- read a selection of bits of said at least one data packet, wherein the selection of bits is contained in at least one field of said at least one data packet and wherein the at least one field, including the selection of bits, carry a first type information,
- verify that the selection of bits matches the policy stored in said memory by which packets to said device are solicited, wherein the solicitation of packets is a second type of information carried by said selection of bits and
- forward the at least one data packet to the device, if the selection of bits fulfils the policy of the device.

According to one aspect of the disclosure it relates to device comprising a network communication unit and a processor. The network communication unit is configured to communicate with a communication network. Furthermore, the processor is configured to send, using said communication unit a policy to a firewall, whereby said firewall is instructed to forward packets to the device, which fulfils said policy, said policy defining requirements by which packets to said device are solicited.

With the above description in mind, the object of the present disclosure is to overcome at least some of the disadvantages of known technology as previously described.

BRIEF DESCRIPTION OF THE DRAWINGS

The present disclosure will be more readily understood through the study of the following detailed description of the exemplary techniques/aspects together with the accompanying drawings, of which.

Figure 1:
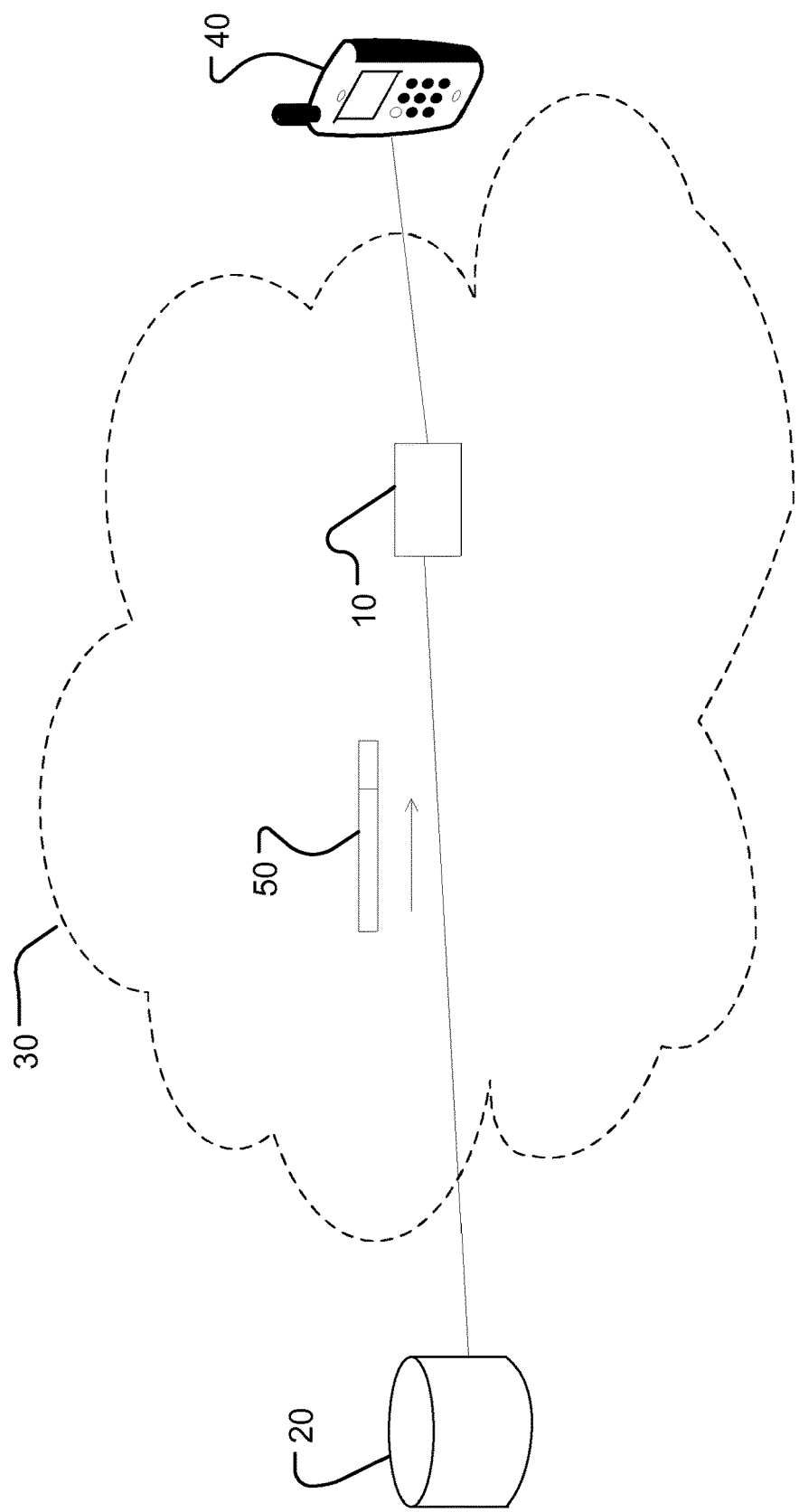
FIG. 1 illustrates a firewall operating in a communication network.

It should be added that the following description of the embodiments is for illustration purposes only and should not be interpreted as limiting the disclosure exclusively to these embodiments/aspects.

DETAILED DESCRIPTION

The general object or idea of examples of the present technique is to address at least one or some of the disadvantages with the prior art solutions described above as well as below. The various steps described below in connection with the figures should be primarily understood in a logical sense, while each step may involve the communication of one or more specific messages depending on the implementation and protocols used.

In this application the term device is generally used. A device, referred to in this application, could be any network device capable of communicating with a network. Communication is either wired or wireless. Examples of such devices are of course mobile phones, smartphones, laptops and M2M devices etc. However, one must appreciate that capability to communicate with a network could be built in almost any device e.g. a car, a lamp post, a scale and so on.

In this application a network is any, wireless or wired, network through which a device communicates with a source node, e.g. Ethernet, a cellular network or a Local Area Network.

Generally a firewall can either be software-based or hardware-based and is used to help keep a network secure. However, this application relates to a smart firewall. Therefore, this disclosure primarily relates to a software based firewall. The primary objective of a firewall is to control the incoming and outgoing network traffic by analyzing the data packets and determining whether it should be allowed through or not, based on a predetermined policy or rule set. This application relates to an inclusive firewall. This implies that packets are not really allowed through, but instead the firewall selects or identifies messages that shall be forwarded to the end user.

A packet is defined as a formatted unit of data carried by the network. A packet consists of two kinds of data, control information and user data (also known as payload). The control information provides data the network needs to deliver the user data. One example is an IPv6 packet, which is the smallest message entity exchanged via the Internet Protocol across an Internet Protocol version 6 (IPv6) network. The embodiments described below are implemented on IP level in an IP network. However, the principle in this disclosure may as well be implemented on other levels and packets, e.g. on service level in e.g. a 3GPP network.

Embodiments of the present disclosure will be described more fully hereinafter with reference to the accompanying drawings, in which embodiments of the disclosure are shown. The embodiments herein generally relates to a wireless device receiving IP packets in a wireless network. This disclosure may, however, be embodied in many different forms and should not be construed as limited to the embodiments set forth herein. Like reference signs refer to like elements throughout.

The disclosure is based on the idea of providing a smart firewall that reads a selection of bits in a packet and then takes a decision regarding if to forward it or not, based on rules corresponding to the selection of bits.

FIG. 1 illustrates a network 30 where a firewall 10 according to the disclosure is operating. The network 30 is e.g. a cellular network. In FIG. 1 a device, in this example a smartphone 40, communicates with a source node, here an application server 20, over a 3GPP network 30. A firewall 10 is located in the path between the device 40 and the source node 20. The firewall is e.g. co-located at a Packet Data Network, PDN, gateway or in a Gateway GPRS Support Node, GGSN.

The source node 20 transmits a data flow comprising packets 50 to the device 40 and vice versa. The packets 50 are e.g. IP packets. The firewall 10 is inclusive, i.e. it identifies solicited packets 50 in an incoming data flow and forwards solicited packets to the device 40.

Figure 2:
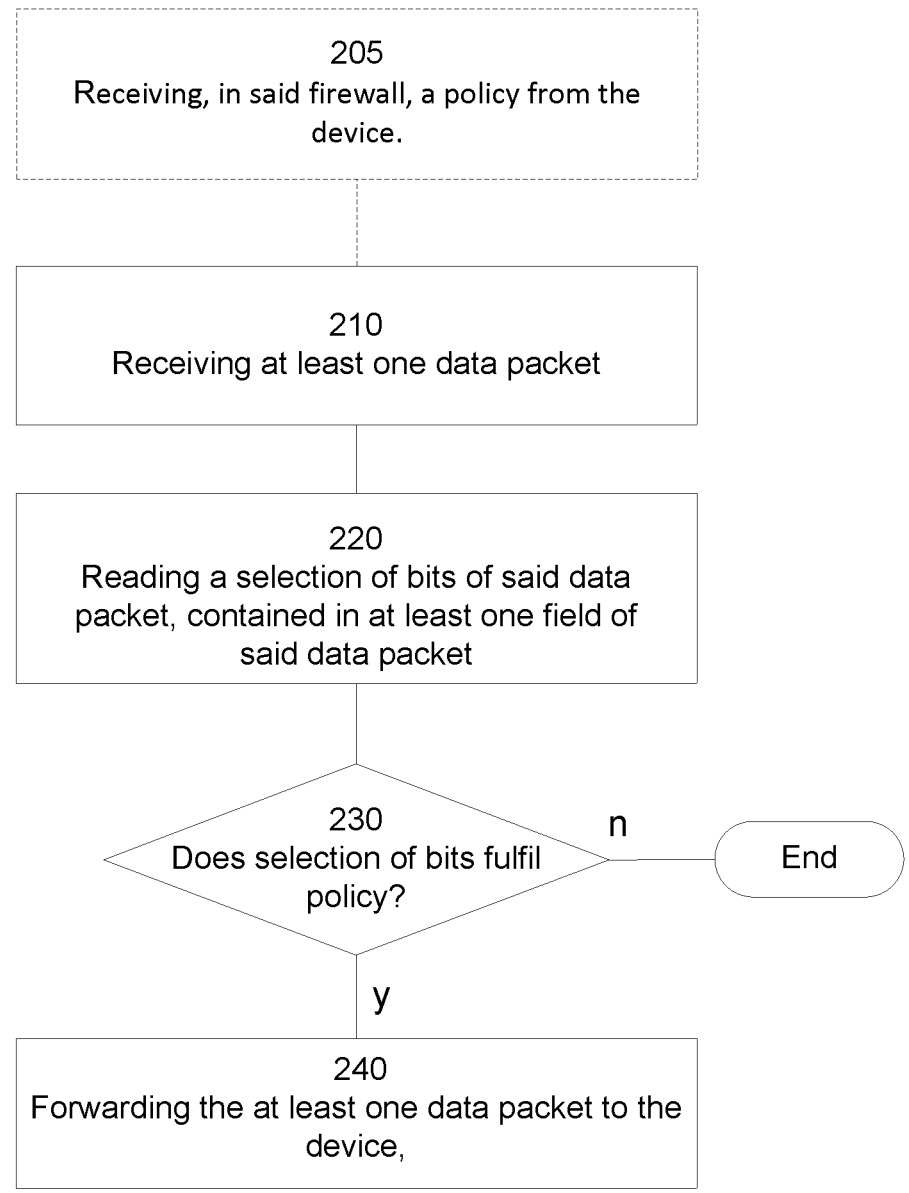
FIG. 2 is a flow chart illustrating the method for controlling a data flow to a device in a communication network according to the present disclosure.

The method for controlling a data flow to a device in a communication network, using a firewall located in the path between said device and a source node, will now be described in more detail referring to FIG. 2.

In the first step 210, the firewall 10 receives at least one data packet 50 of the data flow. In the next step 220 the firewall 10 reads a predefined selection of bits 53 of the data packet 50. The selection of bits corresponds to bits contained in at least one predefined field of said data packet. Hence, the bits are parts of the packet and are not dedicated for use by the firewall. The selection of bits may e.g. be bits contained in an address field, an extension header field or in the payload of the packet. Hence, the at least one field, including the selection of bits, carries a first type information, e.g. address information or payload. The first type of information is not related to soliciting data.

To explain this further, the basic idea of the disclosure is to use a selection of bits in a packet and give it a double meaning. The idea could be compared with a book cipher. A book cipher is a cipher in which the key is a link to some aspect of a book or other piece of text, providing information regarding how a secret may be retrieved. According to this disclosure, the packet data would be the text, the selection of bits would be the secret and the firewall holds information i.e. the key required to read the selection of bits.

Hence, the selection of bits is a hidden, or at least unknown, sequence in the packet data. According to one aspect of the disclosure the key is very simple e.g. the selection of bits corresponds to a particular field in the packet. As an example the source address in an IP Packet may be used. This will be explained in more detail in connection with FIG. 4 below.

However, even more complex patterns including several fields are possible. A prerequisite is of course that the meaning or contents of the packet remain unchanged, at least the fields important to the source and destination. In other words, the selection of bits is part of an original packet that can be used as a control sequence without changing the meaning of the packet.

According to one aspect of the disclosure, the packet including the selection of bits is configured by the source node 20, when composing the packet for transmission to the device. How to map a selection of bits in a packet is commonly known and previously used in other contexts. For example WO2006084895 teaches how to use a hidden sequence in order to set up a secure communication between two devices.

In step 230 the firewall verifies that the selection of bits matches a policy, in said firewall, defining requirements by which packets to said device are solicited. The policy e.g. comprises a sequence, a time schedule or a predetermined number of accesses. According to one aspect of the disclosure, the policy changes over time. For example different sequences are used or different time intervals.

To summarize this, the solicitation of packets is a second type of information carried by said selection of bits. By this expression it is implied that the bits are not dedicated for use by the firewall, but that this usage is a second use, as the bits has a first use in the original packet.

Finally, if the selection of bits fulfils a policy of said device, the firewall forwards 240 the data packet to the device. Packets not fulfilling the rules are discarded or analyzed further. Further analysis is e.g. using traditional firewall techniques in order to decide whether to allow the packet through or not. According to one particular aspect of this disclosure, packets not fulfilling the policy are matched with an exclusive policy in order to decide if the packet shall be forwarded or not.

Hence, the method presented in this disclosure can be used in combination with other firewall techniques. One way of implementing this is to by control one or a few, but not all, ports using this technique and the rest using traditional firewall techniques. An alternative is to use a combination of techniques on all ports. Combinations are of course also possible.

Hence, the technique builds on the idea of retrieving a pattern in a received packet and interpreting the retrieved pattern in order to take a decision on whether to forward a packet to a particular device. There are different aspects of the disclosure that can be applied individually or in any combination. These aspects will now be described in further detail using an IP packet as an example.

Figure 3A:
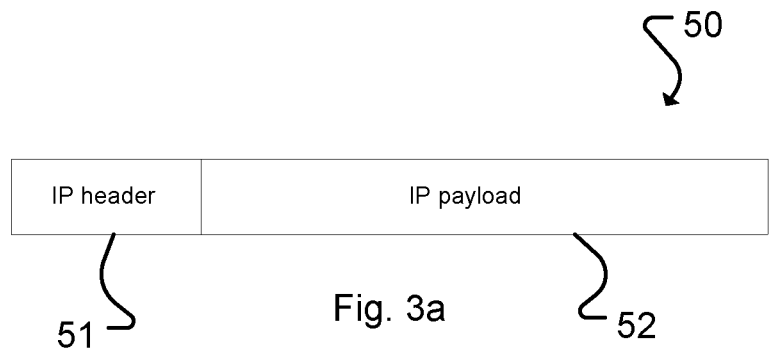
FIG. 3a illustrates an IP packet and FIG. 3b illustrates an IP packet header.

FIG. 3*a* illustrates an IP packet 50 of version 6, IPv6. The IPv6 packet comprises control information for addressing and routing field 51 and a data payload 52. The control information in IPv6 packets is subdivided into a mandatory fixed header and optional extension headers.

Figure 3B:
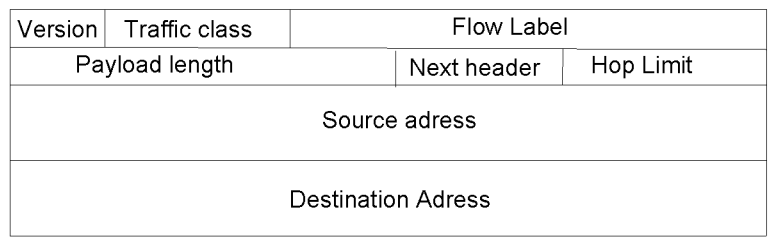

FIG. 3*b* illustrates the mandatory header field of an IPv6 packet in more detail. The fields of the header will now be briefly described.

The Version field defines the IP version, i.e. in this case version 6. Traffic Class is used to classify packets. Flow Label was originally created for giving real-time applications special service. Payload Length is the size of the payload in octets, including any extension headers and next.

The Header field specifies the type of the next header. This field usually specifies the transport layer protocol used by a packet's payload. Hop Limit corresponds to the "time to live" field of IP version 4. This value is decremented by one at each intermediate node visited by the packet. When the counter reaches 0 the packet is discarded. Source Address (128 bits) is the IPv6 address of the sending node and destination Address (128 bits) is the IPv6 address of the destination node(s).

According to a first aspect of the disclosure, the selection of bits is a control sequence, i.e. a pattern bits or symbols, added to the packet at the source node. The source node adds the control sequence, being a secret shared by the source node and the firewall, without changing the meaning of the original packet. According to this aspect of the disclosure, the device is not necessarily aware of the policy. However, one option is that it is the device that controls the policy and that the device has previously informed the firewall and the source node about which policy to use. In principle, the present disclosure provides a method for controlling the data flow, which may be used in different ways dependant on the circumstances.

The control sequence is e.g. a cryptographically generated address or part of a Hash chain.

A hash chain is the successive application of a cryptographic hash function to a piece of data. By using a hash chain many one-time keys, one for each packet or set of packets, may be generated from a single key or password.

According to another aspect of the disclosure, in order to increase security the control sequence is calculated using data from previous packets.

An example of this aspect is presented in FIGS. 4 and 5. In this example, the packet 50 is an IPv6 packet and the selection of bits 53 is the interface ID, which is a part of the IP header 52. The Interface ID forms the least significant 64 bits of the IPv6 address, whereas the most significant 64 bits are the network prefix that is used for routing.

Figure 4A:
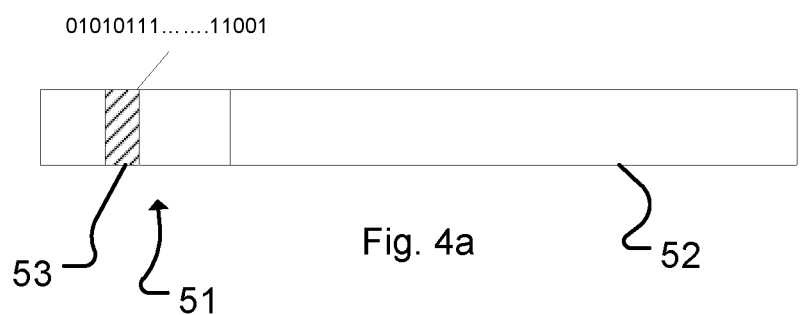
FIG. 4a illustrates a selection of bits defining a first and a second type of information in an IP packet.
Figure 4B:
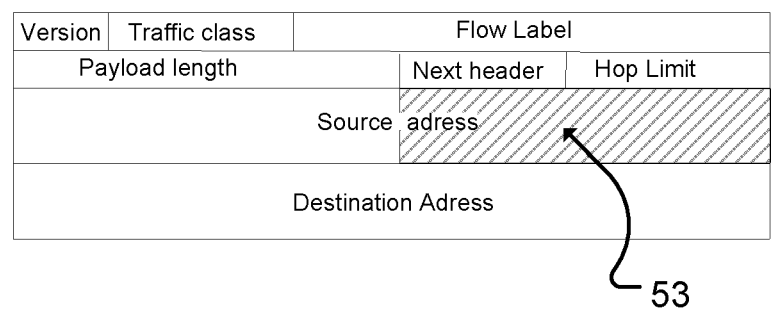
FIG. 4b illustrates a selection a first and a second type of information in an IP header.

The rules then define constraints on what kind of Interface Identifier, IID, can be used either as the source or address of an incoming packet or flow. FIGS. 4*a* and 4*b* illustrates an IPv6 packet comprising a selection of bits 53 defined as the interface ID of the source address.

Figure 5A:
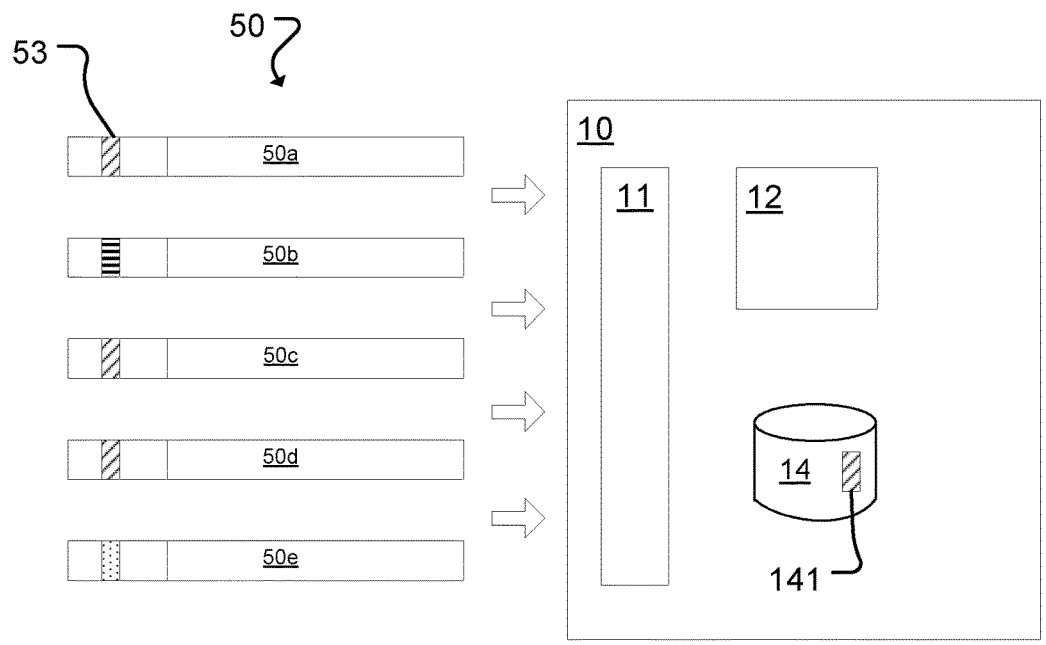
FIGS. 5a and 5b illustrates an inclusive firewall configured to execute for controlling a data flow to a device in a communication network.
Figure 5B:
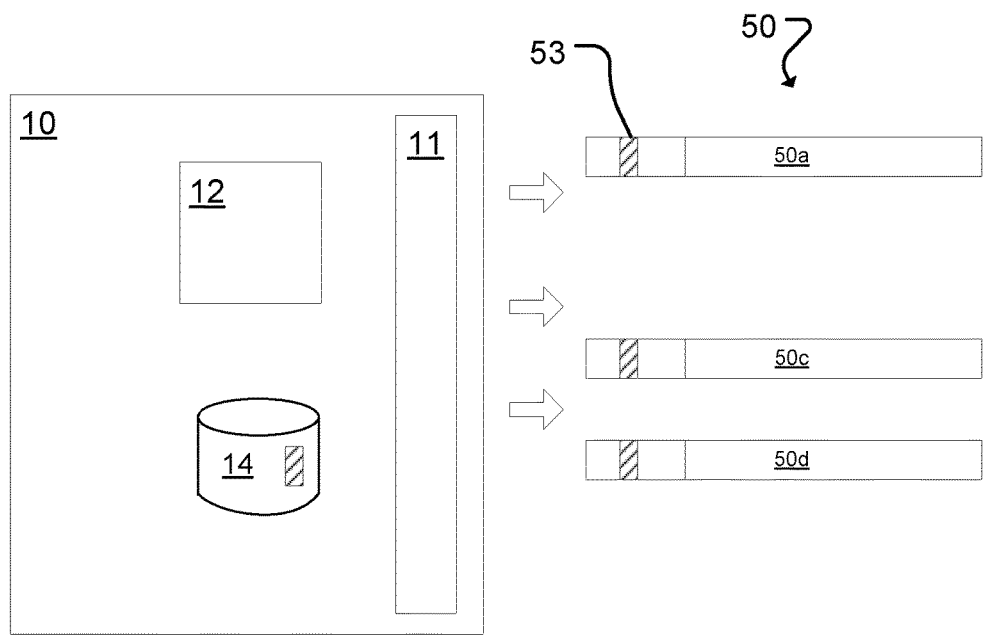

The principle of soliciting IP packets in a firewall 10 using a predefined sequence is disclosed in FIGS. 5a and 5b.

FIG. 5a discloses 5 IP packets 50a-50e of a dataflow being received in a firewall 10. In the drawing it appears that all the packets 50a-50e arrive simultaneously. However, this is not necessarily the case, but is an option suitable for illustration purposes. The packets may as well arrive in a sequence as part of a serial flow.

The firewall disclosed in FIGS. 5a and 5b comprises a network communication unit 11, a processor 12 and a memory 14.

The network communication unit 11 is configured to communicate with the communication network.

The memory 14 is configured to store a policy defining requirements by which packets to said device 40 are solicited. Even if the firewall always needs to know the policy, it may be controlled by different parties.

According to one aspect of the disclosure it comprises an interface, where the operator or service provider adds or modifies policies. The policy may also be defined by the source node or by the device itself, as will be defined in the aspect described below.

The processor 12 is configured to control the operation of the firewall 10. In other words, the processor is configured to receive, using said network communication unit 11, at least one data packet of said data flow, The processor 12 is further configured to read a selection of bits of said at least one data packet, wherein the selection of bits is contained in at least one field of said at least one data packet and wherein the at least one field, including the selection of bits, carry a first type information, The processor 12 is further configured to verify that the selection of bits matches the policy stored in said memory 14 by which packets to said device are solicited, wherein the solicitation of packets is a second type of information carried by said selection of bits and The processor 12 is further configured to forward the at least one data packet to the device (40), if the selection of bits fulfils the policy of the device 40.

In this particular example five IP packets 50a-50e are received by the network communication unit 11. The received packets 50a-50e comprises different sequences 53, which is illustrated by different patterns 53. Only packets 50a, 50c and 50e comprise a pattern, illustrated with transverse stripes, that match the sequence 141 of the policy stored in the memory 14.

As described above, the firewall 10 forwards packets having a selection of bits that fulfils the policy of said device 40 to the device 40. Hence, in this example, only packets 50a, 50c and 50e are solicited. Thus, only packets 50a, 50c and 50e are forwarded to the device 40. This is illustrated in FIG. 5b. Hence, unwanted traffic is stopped, because only packets fulfilling the policy 141 are allowed through the firewall.

According to this first example of this disclosure, only IID packets having a source IID matching a sequence out of a given selection of predefined sequences are solicited. Such an implementation would be useful in a 3GPP-style network where a GGSN by default routes all packets having a given network prefix to the terminal, but the terminal will in reality just have one or very few addresses or ports in use within that network prefix. A traditional firewall could e.g. operate on port number or address and would then allow traffic only on the active ports or addresses.

The proposed solution instead uses a sequence, which is a secret shared by the source node and the firewall, through which solicited packets are identified. The source node then formats the source IID of the packets in order to match the sequence, i.e. the shared secret. Note that, in this case, the device would not even need to know the sequence.

By this method random address or port scans from the Internet are prevented. Furthermore, the device has freedom to change its address, which may be desirable in order to stay anonymous, without updating the firewall with the present address, because the firewall does not operate on the address or port number. Hence, this technique provides larger freedom without increasing the risk of scan attacks.

This was a very simple example, where the policy is a sequence. Here are some further examples of rules that can be set.

According to one aspect of this disclosure the control sequence is cryptographically generated, e.g. the source Interface ID is a Cryptographically Generated Address. The cryptographically generated control sequence is formed from cryptographic material known to the firewall. RFC 3972 (www.ietf.org) provides one way of generating cryptographic addresses. The packet may have an extension header that proves the source has sent the packet.

According to one aspect of this disclosure the control sequence is calculated using data from previous packets. According to one exemplary technique, the Interface ID is calculated from a one-way function that takes fields from the packet and a previously agreed key as input.

According to one exemplary technique, the Interface ID, IID, forms a hash chain, i.e. the IID in the previous packet was the hash of the IID in this packet. The sequence of packets then contains information necessary to calculate the control sequence and prove that the source is in possession of the corresponding cryptographic material, i.e. that the source is trusted. Since the IIDs are revealed in reverse order, attackers cannot know which IID comes next. The firewall may be checking that access is granted for a given public key. A header in the packet may carry the extra bits to calculate the control sequence and a signature, e.g. by control sequence=hash (public key, extra bits). The computed control sequence would then be compared with the selection of bits read from the packet. If there is a match, the packet is solicited.

A second aspect of the disclosure is to apply flow control. Flow control may be applied by the policy further defining a predefined number of connections or packets per selection of bits. A predefined number of connections imply that for a certain selection of bits only a limited number of connections or sessions are allowed. For example, one selection of bits may only have 5 sessions running in parallel. Another example is that the policy defines a number of packets in terms of a limited amount of data per selection of bits.

According to one aspect of the disclosure the policy comprises a predefined number of solicited connection attempts on a particular selection of bits, derived from the selection of bits, per time unit. The load control may e.g. be defined as maximum five connection attempts per minute from anyone on a particular selection of bits, wherein the address is derived from the selection of bits.

According to a particular aspect of this technique the policy comprises a predefined number of solicited connection attempts on a particular set of bits. Such a policy may be used in order to share transmission certificates.

Imagine that a user of a device has acquired ten data transmission certificates from an operator. The user then must use a transmission certificate each time he or she wants to receive data. When the user wants to receive data, the user sends a certificate to the source, e.g. service provider, who creates packets fulfilling a policy defined by the certificate.

After the data transmission, the certificate is not valid anymore. Each certificate is e.g. valid for a specific time or for a predetermined amount of data.

A third aspect of the disclosure relates to a method for controlling a data flow, wherein the policy comprises a schedule for soliciting packets. As an example a particular device is only available for receiving traffic at particular moments in time. This may be feasible for an energy harvesting Machine to Machine, M2M, device, which only wakes up now and then, e.g. one per hour, in order to receive incoming data.

According to one aspect of the disclosure the schedule is cyclic.

It must be appreciated that the above mentioned policies may also be applied in combination. For example, the sequence policy may of course be used in combination with the attempt policy and or the sequence policy.

According to a further aspect of the disclosure, which may be applied in combination with any of the policies described above, the method further comprises receiving 205, in said firewall, a policy from the device. The policy defining the rules for a particular device is then received from the device, before a packet is received 210. This aspect of the disclosure may be seen as the device sets its own rules.

One example is that a device informs the firewall about a cyclic policy, defining moments in time when the device receives packets. Consider for example a M2M device as mentioned above. Such a device may want to inform the firewall that it only wants to receive packets at certain moments in time.

Hence, it is not always necessary that the source knows about the policy or key. According to one aspect of the disclosure, the firewall comprises rules applying to all traffic coming from a particular source, without the source knowing about it.

The rules may be defined by the device itself or by another party. According to one aspect of the disclosure an operator sets rules for its subscribers.

Another example is a device informing a firewall that packets comprising a certain key are always solicited. The device may e.g. have agreed on such a sequence with server or similar.

The technique, in all variants described above, is also applicable to a multicast flow, where one source communicates with several devices. In IPv6 a packet that is sent to a multicast address is delivered to all devices that have joined the corresponding multicast group. Hence, in this example solicitation is not necessarily tied to a device, but may e.g. be tied to a group.

According to one aspect of the disclosure the operator or source adds a policy tied to a multicast group. According to one aspect of the present technique a firewall is co-located at a router where packets are duplicated for multicast purpose. Such a firewall then solicits the traffic before it is duplicated for multicast purpose in order to verify correctness. Thus, unwanted traffic is stopped before loading the network. Hence, further analysis about the stream would not be required before duplication.

Figure 6:
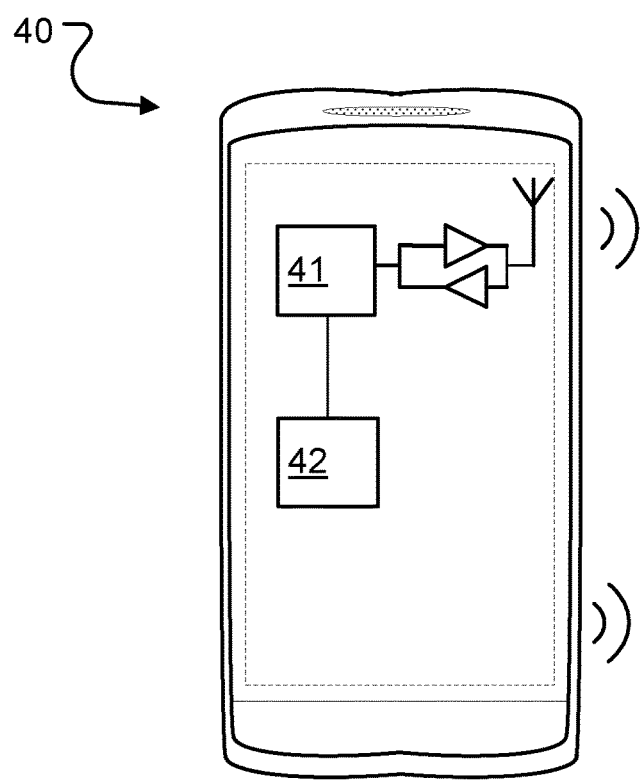
FIG. 6 illustrates a device according to an exemplary technique.

Turning now to FIG. 6 a schematic diagram illustrating some modules of an exemplary technique of the device 40 will be described. A device referred to in this application could be any device capable of communicating, wirelessly or by wire, with a communication network. Examples of such devices are of course mobile phones, smartphones, laptops and Machine to Machine, M2M, devices etc. However, one must appreciate that capability to communicate with a network could be built in almost any device e.g. a car, a lamp post, a scale and so on.

In the example disclosed in FIG. 6, the device 40 is a mobile phone. The mobile phone 40 comprises a network communication unit 41 and a processor 42.

The network communication unit 41 is configured to send and receive data to and from a communication network 30. In this example the communication unit 41 is a wireless communication unit. However, if the device is a wired unit, the network communication is e.g. a network interface card, NIC.

The processor 41 controls the operation of the device 40. The processor 41 is configured to send a policy to a firewall, whereby said firewall is instructed to forward packets to the device, which fulfils said policy, said policy defining requirements by which packets to said device are solicited. Thereby, the device informs the firewall about policies or rules applying to it.

Figure 7:
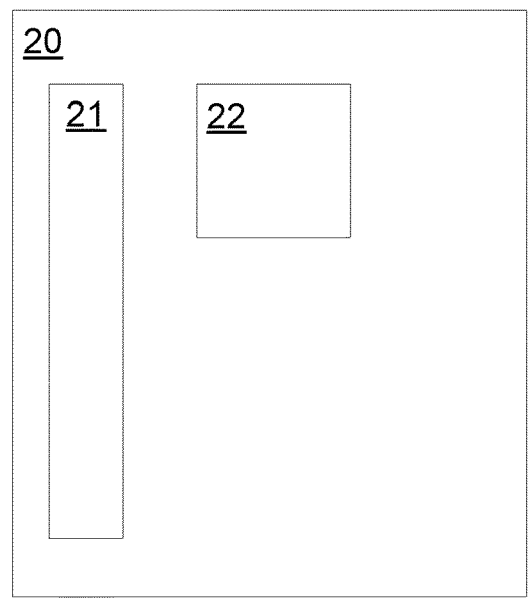
FIG. 7 illustrates a source according to an exemplary technique.

Turning now to FIG. 7 a schematic diagram illustrating some modules of an exemplary technique of the source 20 will be described. A source referred to in this application could be a network entity or a peer. The source could in principle be any device capable of communicating, wirelessly or by wire, with a communication network. Examples of such devices are servers, computers, wireless devices etc.

The source 20 comprises a network communication unit 21 and a processor 22. The source compiles packets for transmission to a destination i.e. a device 20 or a multicast address.

The network communication unit 21 is configured to communicate with a communication network 30.

The processor 22 is configured to create packets 50 for delivery to a destination, in accordance with the principles presented above. The packets comprise a selection of bits 53. The selection of bits is contained in at least one field of the data packet 50. The at least field or fields, including the selection of bits, carry a first type information. The first type of information is typically a predefined field in a defined data packet, such as an IP packet, as described above.

The selection of bits further matches a predefined policy defining requirements by which packets 50 are solicited. The solicitation of packets is a second type of information carried by said selection of bits and sending said packets to the destination 40 via the communication network 30 using the communication unit 21. Hence, the selection of bits comprises a second or hidden meaning.

According to one aspect of the disclosure it relates to a source wherein the a processor 22 is further configured to send, using the communication unit 21 a policy to a firewall 10, whereby said firewall 10 is instructed to forward packets to the destination, which fulfils said policy. This is typically done before the source starts transmitting packets.

An alternative is that the source receives information about the policy from a device i.e. a destination, a firewall, a user, an operator or by any other party.

The invention claimed is:
1. A method for controlling a data flow to a device in a communication network, the method comprising:
 receiving, at a firewall located in a path between said device and a source node, a first data packet transmitted by the source node and a second data packet transmitted by the source node, wherein the first data packet is received before the second data packet,
 obtaining, by the firewall, a first policy sequence related to the device, wherein the first policy sequence is a secret that was provided to the source node prior to the source node transmitting the first and second data packets, obtaining a first sequence of bits from an address field of the first received data packet, obtaining a second sequence of bits from an address field of the second received data packet, comparing the second sequence of bits with the first policy sequence or a second policy sequence derived from the first policy sequence to determine whether the second sequence of bits is identical to at least one of the first and second policy sequences, determining whether the first sequence of bits is a hash of the second sequence of bits, and performing one of:

forwarding the first and second data packets to the device as a consequence of determining that the second sequence of bits is identical to at least one of the policy sequences and the first sequence of bits is a hash of the second sequence of bits, and discarding the first and second data packets such that the first and second data packets are not forwarded to the device as a consequence of determining that the second sequence of bits is not identical to either of the policy sequences or that the first sequence of bits is not a hash of the second sequence of bits.

2. The method of claim 1, further comprising the firewall receiving from the device information for identifying the first policy sequence.

3. The method of claim 1, wherein the first policy sequence is related to flow control of the device.

4. The method of claim 1, wherein the first policy sequence is based, at least in part, on a predefined number of connections or packets per selection of bits.

5. The method of claim 4, wherein the predefined number of connections or packets is defined per time unit.

6. The method of claim 1, wherein the firewall is collocated with a Packet Data Network gateway.

7. The method of claim 1, wherein the firewall is collocated with a Gateway GPRS Support Node.

8. The method of claim 1, wherein the first data packet is an Internet Protocol version 6 packet.

9. The method of claim 8, wherein the first sequence of bits is an Interface Identifier.

10. A firewall for controlling a data flow to a device in a communication network, the firewall comprising:

a receiver;

a transmitter; and a processor coupled to the receiver and the transmitter, wherein the processor is configured to:

obtain a first data packet transmitted by a source node and received via the receiver, obtain a second data packet transmitted by the source node and received via the receiver, wherein the first data packet is received at the firewall before the second data packet is received at the firewall, obtain a first policy sequence related to the device, wherein the first policy sequence is a secret that was provided to the source node prior to the source node transmitting the first and second data packets, obtain a first sequence of bits from an address field of the first received data packet, obtain a second sequence of bits from an address field of the second received data packet, compare the second sequence of bits with the first policy sequence or a second policy sequence derived from the first policy sequence to determine whether the second sequence of bits is identical to at least one of the first and second policy sequences, determine whether the first sequence of bits is a hash of the second sequence of bits, forward the first and second data packets to the device as a consequence of determining that the second sequence of bits is identical to at least one of the policy sequences and the first sequence of bits is a hash of the second sequence of bits, and discard the first and second data packets such that the first and second data packets are not forwarded to the device as a consequence of determining that the second sequence of bits is not identical to either of the policy sequences or that the first sequence of bits is not a hash of the second sequence of bits.

11. The firewall of claim 10, wherein the first policy sequence is related to flow control of the device.

12. The firewall of claim 10, wherein the first policy sequence is based, at least in part, on a predefined number of connections or packets per selection of bits.

13. The firewall of claim 12, wherein the predefined number of connections or packets is defined per time unit.

14. The firewall of claim 10, wherein the firewall is collocated with a Packet Data Network gateway.

15. The firewall of claim 10, wherein the firewall is collocated with a Gateway GPRS Support Node.

16. The firewall of claim 10, wherein the first data packet is an Internet Protocol version 6 packet.

17. The firewall of claim 16, wherein the first sequence of bits is an Interface Identifier.

* * * * *